3,148,025
STABILIZATION OF SULFUR TRIOXIDE AND
HIGH STRENGTH OLEUMS
Richard W. Cornely, Belle Mead, and Charles F. Hopper, Hazlet, N.J., assignors to E. I. du Pont de Nemours and Company, Wilmington, Del., a corporation of Delaware
No Drawing. Filed Mar. 2, 1961, Ser. No. 92,741
12 Claims. (Cl. 23—167)

This invention relates to liquid sulfur trioxide and high-strength oleums that are stabilized against polymerization; and to the stabilization thereof employing certain benzene derivative compounds as polymerization inhibitors.

This application is a continuation-in-part of application Serial Number 771,214, filed November 3, 1958, now abandoned.

As is well known, sulfur trioxide exists in three forms having melting points of 17° C., 32.5° C. and 62° C. The polymeric form melting at 62° C., alpha $SO_3$, is the stable form under ordinary conditions. Upon freezing or even after standing at room temperature a short time, the liquid gamma form (melting point 17° C.) ordinarily changes to the solid forms.

This transition of liquid sulfur trioxide to solid polymeric forms is extremely undesirable from the standpoint of ease in handling and usage. In most instances, prior to usage, the solidified sulfur trioxide must be remelted by heating to temperatures up to about 100° C., thereby developing dangerous high pressures in some instances.

High-strength oleums of free sulfur trioxide strengths upward of about 80% tend to polymerize in a similar fashion. The degree of polymerization depends chiefly upon the sulfur trioxide strength of the oleum and the temperatures at which the material is stored. While polymerization will not proceed sufficiently far in some of these oleums to give a completely solid product, the degree of polymerization increases with the passage of time so that the ultimate mass will ordinarily contain solid forms of $SO_3$ in suspension in the oleum. This polymerization of sulfur trioxide in high-strength oleums is also highly undesirable.

According to this invention, liquid sulfur trioxide and oleum of $SO_3$ strength such that $SO_3$ polymers tend to form can be stabilized against the formation of alpha $SO_3$ polymers by incorporating therein a minor amount of one or more compounds from the group represented by the following formula:

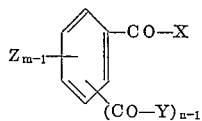

where

X and Y can be the same or different and are —OH, chlorine, $NH_2$, $N(CH_3)_2$, —OM where M is sodium or potassium, methoxy, ethoxy, $—OCH_2CH_2Cl$, or $—OCH_2CH_2OCH_3$;
Z is chlorine, bromine, —OH, alkyl of 1 or 2 carbon atoms, or alkoxyl of 1 or 2 carbon atoms;
$n$ is a whole number less than 3, namely 1 or 2; and
$m$ is a whole number from 1 through 6, namely 1, 2, 3, 4, 5 or 6, provided that when Z is —OH, $—OCH_3$ or $—OCH_2CH_3$, $m$ is 2 and $n$ is 1; and that when Z is methyl or ethyl, $m$ must be 2 or 3;

and Z substituted or unsubstituted derivatives of the above where $n$ is 2 and X and Y taken together are the divalent —NH— (the imide) or —O— (the anhydride or the dianhydride); and reaction products of these stabilizing compounds and the composition being stabilized.

Liquid sulfur trioxide and high-strength oleums are according to this invention stabilized against the formation of a harmful amount of polymerized solids. Some of the compounds within the scope defined above, for example, substantially stabilize anhydrous $SO_3$ in the gamma form. Polymerization to the beta form can be readily limited.

The total amount of polymerization inhibitor from the class defined above to be incorporated into the $SO_3$ or oleum will vary with the use for which the $SO_3$-containing product is intended and with the conditions it will be expected to meet. The stabilizing influence of the particular compound or compounds used is proportional to the amount present and, as can be seen from the examples hereinbelow, as little as 0.02% by weight of stabilizer produces good results. Even as little as 0.01% is beneficial. In general, it usually is desirable to use only sufficient amount to stabilize the product against substantial polymerization of $SO_3$, although relatively larger amounts of inhibitor can be used where the presence of an excess is not objectionable. In most instances, it is desirable to use no more than about 2% by weight of stabilizer, with from 0.05 to 0.10% based on the free $SO_3$ content being the preferred range. The higher percentages ordinarily are employed to stabilize the oleums. Higher percentages can also be used to effect stabilization of oleums in the gamma form.

Illustrative of the compounds within the scope of this invention, as defined by the above structural formula, can be mentioned the following:

Benzoic acid
o-Chlorobenzoic acid
p-Chlorobenzoic acid
2,4-dichlorobenzoic acid
Benzoyl chloride
p-Chlorobenzoyl chloride
Benzamide
Salicylic acid
Acetylsalicylic acid
Sodium salicylate
Methyl salicylate
Salicylamide
o-Phthalic acid
Phthalic anhydride
Tetrabromophthalic anhydride
Tetrachlorophthalic anhydride
Isophthaloyl chloride
Diethyl phthalate
Dimethyl o-phthalate
Dimethyl isophthalate
Dimethyl terephthalate
Bis(2-methoxyethyl) phthalate
Phthalimide
Bis(2-chloroethyl) phthalate
N,N-dimethyl benzamide
Pyromellitic dianhydride
Hexahydrophthalic anhydride The preferred stabilizing compounds according to this invention include phthalic acid and its dialkyl derivatives, in particular, dimethyl-o-phthalate. Other preferred compounds include isophthaloyl chloride, salicylamide, bis(2-methoxyethyl) phthalate and tetrachlorophthalic anhydride.

The preferred compositions of this invention consist of liquid sulfur trioxide or oleum containing not more than about 0.1% of water, which materials are stabilized with from about 0.01% to 2%, and preferably 0.05 to 0.10%, by weight of a compound defined above. Oleum containing not more than about 0.1% of water is, of course, oleum of $SO_3$ strength not less than about 99.4% and sulfuric acid content of not more than 0.56%. These materials high in sulfur trioxide can be stabilized readily so as to resist polymerization even after storage for extended periods of time.

It is, of course, contemplated by the present invention that the novel and useful stabilized compositions can contain reaction products formed by reaction between the stabilizing compound and the other components of the composition. It has been found that these reactions products themselves exert a significant stabilizing or polymerization inhibiting influence upon the composition.

The stabilized $SO_3$ compositions of this invention can be prepared in any desired manner. Thus, the stabilizer or stabilizers can be added to the liquid sulfur trioxide or vice versa. The compounds can be formed prior to admixture with the $SO_3$ compositions or formed in situ. Still another way of preparing stabilized pure liquid sulfur trioxide is to condense $SO_3$ vapor in a closed vessel containing the desired amount of the stabilization material.

Special advantages are obtained when the compositions to which the stabilizer has been added are given a heat treatment for a period of time. The time and temperature for optimum benefits will depend on the particular stabilizer selected, the nature of the composition being stabilized, the economics of the situation and the effect desired. Satisfactory temperatures range from room temperature, e.g., about 20° C. to 44° C., but other temperatures can be used. The duration of the heating period is not particularly critical, with a time as long as 100 hours being feasible, and 1 to 48 hours preferred.

In order that the invention can be better understood, the following examples in addition to those set forth above are given:

*Example 1*

0.1% dimethyl o-phthalate was added to anhydrous liquid sulfur trioxide. After shaking the mixture for about one minute, the mixture was immediately placed in storage at −18° C., causing it to solidify in about 90 minutes. The mixture remained solid when reheated to room temperature, but substantially remelted when heated to 40° C.

*Example 2*

0.1% dimethyl o-phthalate was added to anhydrous liquid sulfur trioxide and the mixture stored at room temperature for one week. During that period of time, there was no tendency for solid polymers of sulfur trioxide to form. The stabilized mixture was then frozen at −18° C.; it remelted readily upon reheating to room temperature.

*Example 3*

0.1% dimethyl o-phthalate was added to anhydrous liquid sulfur trioxide. The mixture was heated at 40° C. for 17 hours. The thusly stabilized mixture was frozen by storing at 0° C.; it remelted readily when reheated to room temperature.

*Example 4*

0.05% dimethyl o-phthalate was added to anhydrous liquid sulfur trioxide. The mixture was permitted to remain at room temperature for 64 hours. The thusly stabilized mixture was frozen by storing at 4° C.; it remelted readily when reheated to room temperature. The sample was frozen twice more and each time it readily melted at room temperature. After the third remelting there was approximately 0.1% solid polymers of sulfur trioxide present.

*Example 5*

0.02% dimethyl o-phthalate was added to liquid sulfur trioxide containing 0.5% sulfuric acid. The mixture was heated at 40° C. for 16 hours. The thusly stabilized mixture was frozen by storing at 0° C. Upon reheating to room temperature the mixture remained solid; but upon heating to 40° C. it substantially remelted. The mixture was refrozen at 0° C.; it remelted to a liquid containing approximately 1% solid polymer of sulfur trioxide upon heating to 40° C.

*Example 6*

2% dimethyl o-phthalate was added to liquid sulfur trioxide containing 0.5% sulfuric acid. The mixture was heated at 40° C. for 16 hours. The thusly stabilized mixture was frozen by storing at 0° C. Upon reheating to room temperature, the mixture melted to a liquid containing about 0.5% solid polymers of sulfur trioxide. Upon heating the liquid at 40° C. the remaining solid polymer of sulfur trioxide remelted.

*Example 7*

0.5% dimethyl o-phthalate was added to liquid sulfur trioxide containing 5% sulfuric acid. The mixture was heated at 40° C. for 16 hours. The thusly stabilized mixture was frozen by storing at −18° C. It remelted upon heating to 40° C.

*Example 8*

0.2% salicylamide was added to anhydrous sulfur trioxide. The mixture was heated at 42° C. for 16 hours. The thusly stabilized mixture was frozen by storing at −18° C. Upon reheating to room temperature about 80% of the mixture remelted. Upon heating to 40° C. the remaining solid polymer of sulfur trioxide remelted.

*Example 9*

0.2% salicylamide was added to liquid sulfur trioxide containing 0.5% sulfuric acid. The mixture was heated at 42° C. for 16 hours. The thusly stabilized mixture was frozen by storing at −18° C. Upon reheating to 40° C. the mixture substantially remelted.

*Example 10*

0.5% benzamide was added to anhydrous liquid sulfur trioxide. The mixture was heated at 42° C. for 16 hours. The thusly stabilized mixture was frozen by storing at −18° C. Upon reheating to room temperature approximately 85% of the solid remelted. Upon heating at 40° C. the remaining solid substantially remelted leaving about 0.5% solid polymer of sulfur trioxide.

*Example 11*

0.5% methylsalicylate was added to anhydrous liquid sulfur trioxide. After heating at 42° C. for 16 hours, the mixture was frozen by storing at −18° C. Upon reheating to room temperature the mixture substantially remelted leaving approximately 2% solid polymers of sulfur trioxide.

*Example 12*

0.5% phthalimide was added to anhydrous liquid sulfur trioxide and the mixture heated at 42° C. for 16 hours. The mixture was frozen by storage at −18° C. Upon reheating to room temperature approximately 95% of the solid remelted and the remaining solid polymer of sulfur trioxide remelted upon heating at 40° C.

*Example 13*

0.5% p-chlorobenzoic acid was added to anhydrous liquid sulfur trioxide and the mixture heated at 42° C. for 16 hours. The thusly stabilized mixture was frozen by storing at −18° C. Upon reheating to room temperature approximately 80% of the solid mixture remelted and, upon heating at 40° C., the remaining solid substantially remelted leaving about 2% solid polymer of sulfur trioxide.

*Example 14*

0.5% tetrachlorophthalic anhydride was added to liquid sulfur trioxide containing 1% sulfuric acid and the mixture heated at 42° C. for 16 hours. The thusly stabilized mixture was frozen by storage at −18° C. Upon heating at 42° C. the mixture substantially remelted leaving approximately 0.5% solid polymer of sulfur trioxide.

As will be understood by persons skilled in the art, this invention can be practiced according to the above illustrative examples, using other compounds within the scope of this invention, including but not limited to those listed hereinbefore, by repeating the above examples, substituting for the inhibitors of the examples one or more other stabilizers on a corresponding weight basis.

The invention claimed is:

1. The method of stabilizing liquid sulfur trioxide and high-strength oleums against polymerization which comprises incorporating therein a minor portion of at least one compound selected from the class represented by the formula:

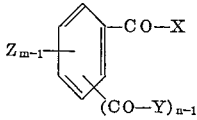

where
- X and Y are selected from the group consisting of —OH; chlorine; —OM where M is selected from the group consisting of sodium and potassium; methoxy; ethoxy; —OCH$_2$CH$_2$Cl; and —OCH$_2$CH$_2$OCH$_3$;
- Z is selected from the group consisting of chlorine, bromine, —OH, alkyl of less than 3 carbons, and alkoxyl of less than 3 carbons;
- $n$ is a positive integer less than 3; and $m$ is a positive integer less than 7; provided that when Z is selected from the group consisting of —OH, methoxy, and ethoxy, $m$ is 2 and $n$ is 1; and also provided that when Z is selected from the group consisting of methyl and ethyl, $m$ is a positive integer selected from the group consisting of 2 and 3 and where $n$ is 2, X and Y can be taken together and are selected from the divalent group consisting of —NH— and —O—.

2. The method of stabilizing liquid sulfur trioxide against SO$_3$ polymerization comprising incorporating therein about 0.01 to 2% of dimethyl o-phthalate.

3. The method of stabilizing liquid sulfur trioxide against SO$_3$ polymerization comprising incorporating therein about 0.01 to 2% of isophthaloyl chloride.

4. The method of stabilizing liquid sulfur trioxide against SO$_3$ polymerization comprising incorporating therein about 0.01 to 2% of bis(2-methoxyethyl)phthalate.

5. The method of stabilizing liquid sulfur trioxide against SO$_3$ polymerization comprising incorporating therein about 0.01 to 2% of tetrachlorophthalic anhydride.

6. The method according to claim 1 wherein said liquid after said incorporating is treated at a temperature from about 20° C. to 44° C. for up to about 100 hours.

7. The method according to claim 2 wherein said liquid after said incorporating is treated at a temperature from about 20° C. to 44° C. for up to about 100 hours.

8. A composition consisting of a material selected from the group consisting of liquid sulfur trioxide and oleum of SO$_3$ strength such that SO$_3$ polymers tend to form and, additionally, in an amount up to 2% by weight, at least one compound selected from the class represented by the formula:

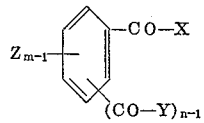

where
- X and Y are selected from the group consisting of —OH; chlorine; —OM where M is selected from the group consisting of sodium and potassium; methoxy; ethoxy; —OCH$_2$CH$_2$Cl; and —OCH$_2$CH$_2$OCH$_3$;
- Z is selected from the group consisting of chlorine, bromine, —OH, alkyl of less than 3 carbons, and alkoxyl of less than 3 carbons;
- $n$ is a positive integer less than 3; and $m$ is a positive integer less than 7; provided that when Z is selected from the group consisting of —OH, methoxy, and ethoxy, $m$ is 2 and $n$ is 1; and also provided that when Z is selected from the group consisting of methyl and ethyl, $m$ is a positive integer selected from the group consisting of 2 and 3 and where $n$ is 2, X and Y can be taken together and are selected from the divalent group consisting of —NH— and —O—.

9. A composition comprising a material from the group consisting of liquid sulfur trioxide and oleum of SO$_3$ strength such that SO$_3$ polymers tend to form and, additionally, from 0.01 to 2% of dimethyl o-phthalate.

10. A composition comprising a material from the group consisting of liquid sulfur trioxide and oleum of SO$_3$ strength such that SO$_3$ polymers tend to form and, additionally, from 0.01 to 2% of isophthaloyl chloride.

11. A composition comprising a material from the group consisting of liquid sulfur trioxide and oleum of SO$_3$ strength such that SO$_3$ polymers tend to form and, additionally, from 0.01 to 2% of bis(2-methoxymethyl)phthalate.

12. A composition comprising a material from the group consisting of liquid sulfur trioxide and oleum of SO$_3$ strength such that SO$_3$ polymers tend to form and, additionally, from 0.01 to 2% of tetrachlorophthalic anhydride.

References Cited in the file of this patent

UNITED STATES PATENTS

| | | |
|---|---|---|
| 2,868,624 | Shaver | Jan. 13, 1959 |
| 2,986,450 | Jones | May 30, 1961 |